United States Patent
Miller et al.

(10) Patent No.: US 9,521,514 B2
(45) Date of Patent: Dec. 13, 2016

(54) METHOD AND APPARATUS FOR CONTROLLING NETWORK ACCESS IN A WIRELESS COMMUNICATION SYSTEM

(71) Applicant: MOTOROLA SOLUTIONS, INC, Schaumburg, IL (US)

(72) Inventors: Trent J. Miller, West Chicago, IL (US); Mario F. Derango, Cary, IL (US); David P. Helm, Carol Stream, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 108 days.

(21) Appl. No.: 14/552,899

(22) Filed: Nov. 25, 2014

(65) Prior Publication Data

US 2016/0150366 A1    May 26, 2016

(51) Int. Cl.
  *H04W 24/00*  (2009.01)
  *H04W 4/02*   (2009.01)
  *H04W 4/08*   (2009.01)
  *H04W 48/02*  (2009.01)
  *H04W 4/22*   (2009.01)

(52) U.S. Cl.
  CPC ............... *H04W 4/021* (2013.01); *H04W 4/08* (2013.01); *H04W 48/02* (2013.01); *H04W 4/22* (2013.01)

(58) Field of Classification Search
  USPC ... 455/404.1, 422.1, 515, 436, 456.4, 456.1; 370/230, 444, 232
  See application file for complete search history.

(56) References Cited

U.S. PATENT DOCUMENTS

| | | | |
|---|---|---|---|
| 8,155,684 B2 | 4/2012 | Agulnik et al. | |
| 8,423,067 B2 | 4/2013 | Schmitt | |
| 8,565,689 B1 * | 10/2013 | Rubin | G06F 11/00 370/232 |
| 2004/0032877 A1 | 2/2004 | Chuah et al. | |
| 2007/0238454 A1 | 10/2007 | Chambers | |

(Continued)

FOREIGN PATENT DOCUMENTS

| | | |
|---|---|---|
| AU | 2013201283 A1 | 3/2013 |
| EP | 1209886 A2 | 5/2002 |

(Continued)

OTHER PUBLICATIONS

Kunz Andreas et al: "Disaster response in 3GPP mobile networks", 2013 IEEE International Conference on Communications Workshops (ICC), IEEE, Jun. 9, 2013 (Jun. 9, 2013), pp. 1226-1231.

(Continued)

*Primary Examiner* — David Q Nguyen

(57) ABSTRACT

A method and apparatus are provided for controlling network access in a wireless communication system. An infrastructure device, which may reside in, or be communicatively coupled to, any of an access network, a core network, and a service network, implements a device class prioritization control function (DCP-CF) that receives a geographical location of an incident, determines one or more of a cell and an access node corresponding to the geographical location, determines one or more access class barring parameters for the cell and/or access node, determines whether to enable access class barring at the cell and/or access node and, in response to determining to enable access class barring at the cell and/or access node, provides the one or more access class barring parameters to the cell and/or access node.

18 Claims, 4 Drawing Sheets

(56) References Cited

U.S. PATENT DOCUMENTS

| | | | |
|---|---|---|---|
| 2011/0105109 A1 | 5/2011 | Uemura et al. | |
| 2011/0281547 A1 | 11/2011 | Cordero | |
| 2012/0063305 A1 | 3/2012 | Chiu et al. | |
| 2014/0357297 A1* | 12/2014 | Futaki | H04W 24/10 455/456.1 |
| 2015/0103651 A1* | 4/2015 | Kekki | H04W 28/0289 370/230 |

FOREIGN PATENT DOCUMENTS

| | | |
|---|---|---|
| EP | 2680643 A1 | 1/2014 |
| GB | 2465192 A | 5/2010 |
| WO | 2002017671 A1 | 2/2002 |
| WO | 2008096162 A1 | 8/2008 |
| WO | 2009074186 A1 | 6/2009 |
| WO | 2012020849 A1 | 2/2012 |
| WO | 2013023608 A1 | 2/2013 |
| WO | 2013069968 A1 | 5/2013 |
| WO | 2014009212 A1 | 1/2014 |
| WO | 2014131249 A1 | 9/2014 |

OTHER PUBLICATIONS

International Search Report and the Written Opinion, mailed Feb. 8, 2016, PCT/US2015/060864 filed Nov. 15, 2015, all pages.

\* cited by examiner

METHOD AND APPARATUS FOR CONTROLLING NETWORK ACCESS IN A WIRELESS COMMUNICATION SYSTEM

FIELD OF THE INVENTION

The present invention relates generally to wireless communication systems, and more specifically to controlling network access in a wireless communication system.

BACKGROUND OF THE INVENTION

Land mobile radio (LMR) systems are typically narrowband communications systems used by public safety agencies, for example, emergency first responder organizations, such as police or fire departments, or public works organizations. Users (also referred to as subscribers) on LMR systems may communicate via mobile or portable user terminals, and portable radios or radios in vehicles.

A portion of the United States broadband spectrum, i.e., the 700 MHz spectrum, additionally has been allocated for public safety use, wherein all public safety agencies and all applications used by these public safety agencies are expected to share this portion of the broadband spectrum. Long Term Evolution (LTE) has been selected as the air interface technology for this 700 MHz spectrum. In addition to public safety devices, user equipment (UE) operated by secondary users (for example, utility or government workers) and/or commercial users also may share this portion of the broadband spectrum. Throughout the world, public safety has opportunities to share radio spectrum with secondary and commercial users. This creates a challenge in determining the appropriate priority for a UE operating on the shared broadband spectrum. For example, if a UE operated by a police officer and a UE operated by a commercial user contend for the same resources, a determination must be made as to which user equipment is given access to those resources.

LTE is a broadband standard for wireless data communications. A 3GPP (Third Generation Partnership Project) LTE system includes, among other components, a core network for handling data traffic and a network of eNodeBs (eNBs), each of which functions as a base station for the LTE system and forwards user data and signaling between the core network and UEs operating on the LTE system. In a 3GPP LTE system, in order to control access to the network by a UE, and in particular to a Random Access Channel (RACH), various barring capabilities have been defined which are intended to limit surges is usage of the RACH. These barring capabilities include, but are not limited to Access Class Barring, Service-Specific Access Control, Extended Access Barring, and Closed Subscriber Group checking.

An eNodeB may be configured to limit user access by broadcasting various parameters associated with the barring capabilities, such as access class barring (ACB) parameters, in a downlink SIB2 (System Information Block Type 2) message. UEs are pre-configured with at least one access class (AC) in a SIM (subscriber identity module) and use the access class(es) to determine whether they can access the system, that is, begin to utilize an access channel, based on the SIB2 message and their stored AC(es). For example, commercial users may be randomly assigned an AC of '0' to '9,' AC '10' is reserved for E911 calls, ACs '11' and '15' are reserved for network administrative device, and the remaining ACs of '12' to '14' are reserved for public safety and next generation network (NGN) government emergency telecommunications service (GETS) workers, that is, AC '12' is reserved for security services (for example, police), AC '13' is reserved for public utilities, and AC '14' is reserved for emergency services (that is, emergency responders, such as fire and emergency medical personnel (EMTs)).

The ACB parameters transmitted by the eNodeB over-the-air include 'ac-BarringFactor,' ac-BarringTime, 'ac_BarringForEmergencyFactor,' and 'ac-BarringForSpecialAC.' For users with an AC of 0-9, the user's UE generates a random number ('RAND') and compares the RAND to a threshold value (the ac-BarringFactor received from the eNodeB over-the-air). If the RAND is less than the threshold, then the UE can access the network. Otherwise the UE has to wait. Thus, by setting an ac-BarringFactor, an eNodeB can control UE access and mitigate congestion. If the user is making an emergency call (AC 10), then their access is controlled by an ac_BarringForEmergencyFactor parameter, and for users having an AC of 11-15, their access is controlled by the parameter ac-BarringForSpecialAC. If a UE utilizes AC 10 (that is, dials an emergency number) or is configured with AC 10-15, and the corresponding eNodeB parameter indicates barring should not take place, the UE can immediately access the eNodeB's RACH.

Figure 1:
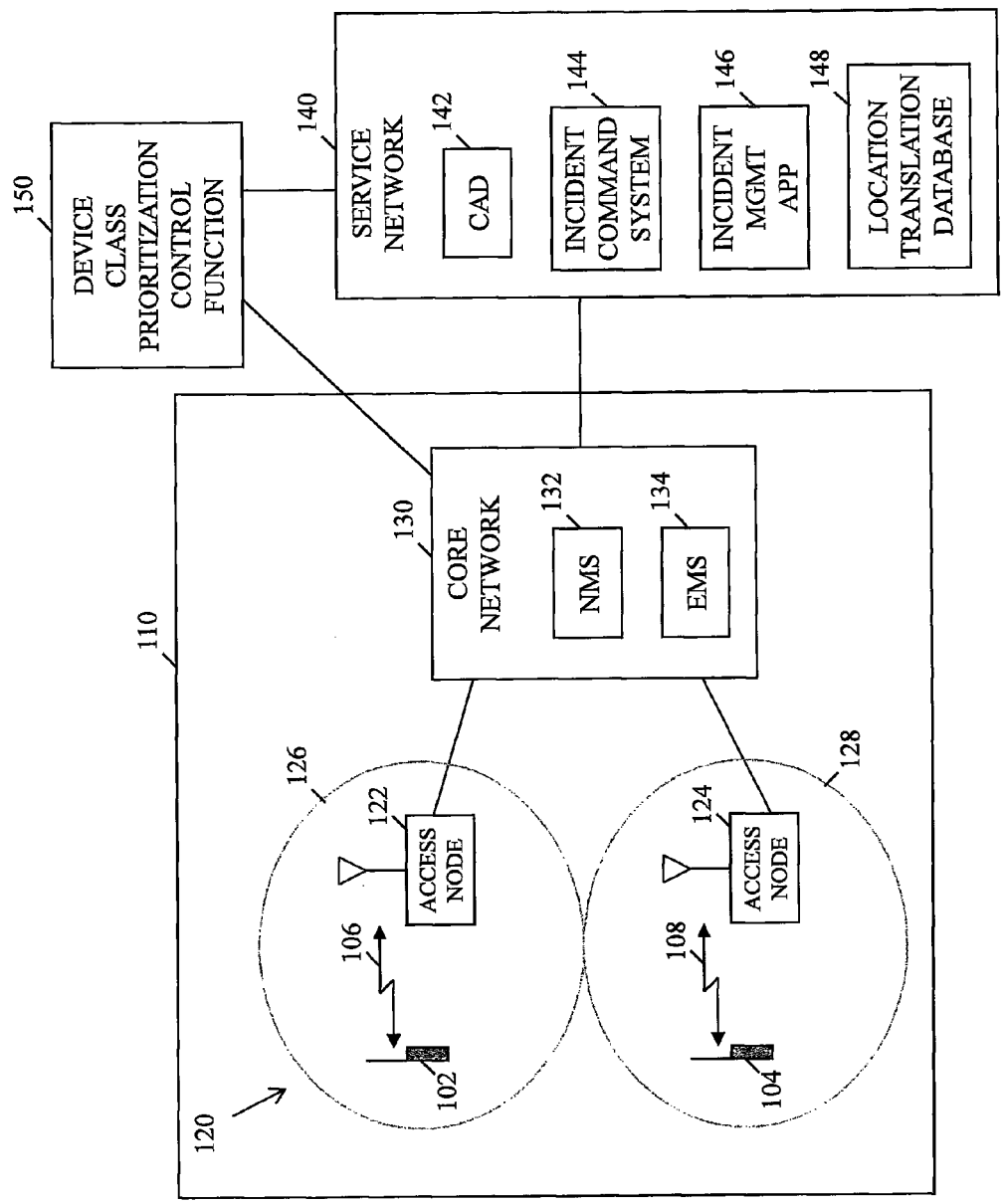
FIG. 1 is a block diagram of a wireless communication system in accordance with various embodiments of the present invention.
Figure 2:
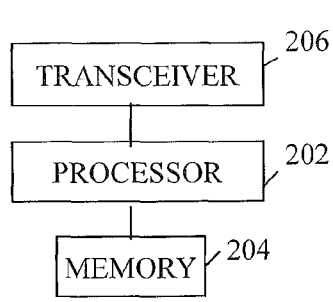
FIG. 2 is a block diagram of a user equipment of FIG. 1 in accordance with an embodiment of the present invention.
Figure 3:
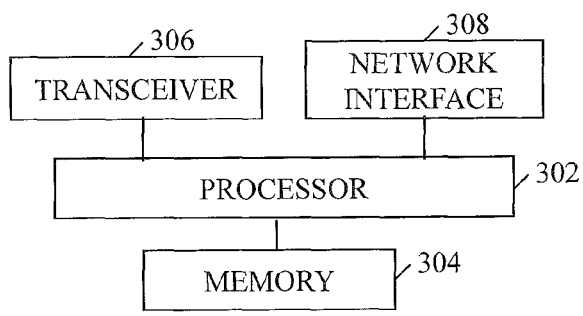
FIG. 3 is a block diagram of a wireless access node of FIG. 1 in accordance with an embodiment of the present invention.
Figure 4:
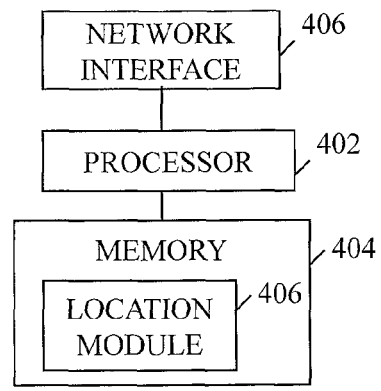
FIG. 4 is a block diagram of a core network element of FIG. 1 in accordance with an embodiment of the present invention.
Figure 5:
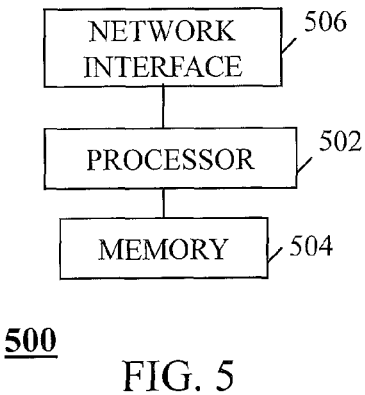
FIG. 5 is a block diagram of a service network element of FIG. 1 in accordance with an embodiment of the present invention.
Figure 6:
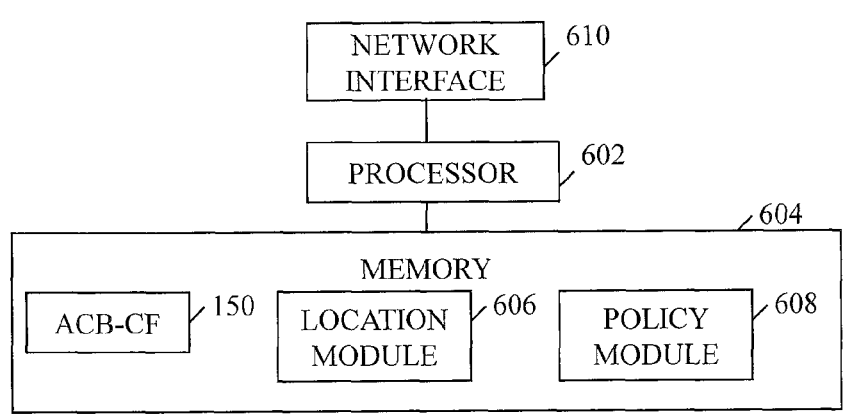
FIG. 6 is a block diagram of a element of FIG. 1 implementing an Access Class Barring Control Function (DCP-CF) in accordance with an embodiment of the present invention.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

A method and apparatus are provided for controlling network access in a wireless communication system. An infrastructure device, which may reside in, or be communicatively coupled to, any of an access network, a core network, and a service network, implements an device class prioritization control function (DCP-CF) that receives a geographical location of an incident, determines one or more of a cell and an access node corresponding to the geographical location, determines one or more barring parameters for the cell and/or access node, determines whether to enable a 3GPP barring capability at the cell and/or access node and, in response to determining to enable a 3GPP barring capability at the cell and/or access node, provides the one or more access class barring parameters to the cell and/or access node.

Generally, an embodiment of the present invention encompasses a method for controlling network access in a wireless communication system. The method includes receiving, at an infrastructure device, a geographical location of an incident; determining, by the infrastructure device, one or more of a cell and a corresponding access node corresponding to the geographical location; determining one or more access class barring parameters for the one or more of the cell and the corresponding access node; determining whether to enable access class barring at one or more of the cell and the corresponding access node; and in response to determining to enable access class barring at one or more of the cell and the corresponding access node, providing the one or more one or more access class barring parameters to the one or more of the cell and the corresponding access node.

Another embodiment of the present invention encompasses infrastructure device capable of controlling network access in a wireless communication system. The infrastructure device includes a processor and an at least one memory device that is configured to store a set of instructions that, when executed by the processor, implement a device class prioritization control function (DCP-CF), which DCP-CF performs the following functions: receives a geographical location of an incident; determines one or more of a cell and a corresponding access node corresponding to the geographical location; determines one or more access class barring parameters for the one or more of the cell and the corresponding access node; determines whether to enable access class barring at one or more of the cell and the corresponding access node; and in response to determining to enable access class barring at one or more of the cell and the corresponding access node, provides the one or more one or more access class barring parameters to the one or more of the cell and the corresponding access node.

Yet another embodiment of the present invention encompasses a wireless communication system. The wireless communication system includes an access node and an infrastructure device. The infrastructure device is configured to receive a geographical location of an incident; determine one or more of a cell and an access node corresponding to the geographical location; determine one or more access class barring parameters for the one or more of the cell and the corresponding access node; determine whether to enable access class barring at one or more of the cell and the corresponding access node; and in response to determining to enable access class barring at one or more of the cell and the corresponding access node, provide the one or more one or more access class barring parameters to the one or more of the cell and the corresponding access node.

Turning now to the drawings, the present invention may be more fully described with reference to FIGS. 1-8. FIG. 1 is a block diagram of a wireless communication system 100 in accordance with various embodiments of the present invention. Communication system 100 includes multiple user equipment (UE) 102, 104 (two shown). UEs 102 and 104 can be any type of wireless communication device, such as a data terminal used in a vehicle, a Land Mobile Radio (LMR), a cell phone, a smartphone, a mobile data terminal, a Personal Digital Assistant (PDA), a wireless enabled laptop computer or tablet computer, and any other portable device capable of operating in a wireless environment and that can be used by a user in the system. In various technologies, UEs 102 and 104 may be referred to as a mobile station (MS), user terminal (UT), subscriber station (SS), subscriber unit (SU), remote unit (RU), access terminal, and so on. Each of the multiple UEs 102, 104 is configured to operate on one or more wireless networks, such as a first, broadband wide area network (WAN) 110, and to communicate with infrastructure devices in the corresponding network using any suitable over-the-air protocol and modulation scheme.

WAN 110 includes one or more radio access networks 120 (one shown) coupled to a core network 130. Radio access network (RAN) 120 includes multiple wireless access nodes 122, 124 (two shown) that each provides wireless communication services to UEs, such as UEs 102 and 104, residing in a respective coverage area 126, 128, such as a cell, of the access node. Preferably, each wireless access node 122, 124 is an eNodeB; however, access nodes 122, 124 may be any network-based wireless access node, such as an access point (AP) or base station (BS).

Each of the multiple UEs 102, 104 communicate with infrastructure devices of WAN 110, and in particular an access node 122, 124 of the WAN, via a corresponding wireless link 106, 108. Each wireless link 106, 108 includes an uplink and a downlink, which uplink and downlink each includes one or more traffic channels and one or more control channels, the latter including an uplink access channel, for example, a random access control channel (RACH), for use by a UE when the UE requires gaining access to communication system 100, for example, when the UE initiates a call or responds to a page. Preferably WAN 110 is a Third Generation Partnership Project (3GPP) Long Term Evolution (LTE) communication system. However, those who are of ordinary skill in the art realize that communication system 100, and in particular WAN 110, may operate in accordance with any wireless telecommunication system that implements prioritized, controlled access to an uplink access channel.

In some embodiments of the present invention, communication system 100 further may include a second wireless network 120, such as an earlier generation broadband wireless network or a circuit switched wireless network, whose coverage area overlaps with WAN 110. In such an embodiment, the multiple UEs 102, 104 additionally may be configured to operate on network 120.

Core network 130 may include, among other core network elements in the event of an LTE system, a Mobility Management Entity (MME), multiple gateways, such as a Serving Gateway and a Packet Data Network Gateway (PDN GW), a Policy Control and Charging Rules Function (PCRF), and a Home Subscriber Server (HSS). Core network 130 further includes a Network Management System (NMS) 132 and an Element Management System (EMS) 134 that each may be implemented by one of the aforementioned core network elements or that may be separately implemented, or together implemented, by a different core network element.

WAN 110 is coupled to a service network 140 that is hierarchically above core network 130 of the WAN. Service network 140 includes one or more Application Servers (ASs) or other services network elements implementing an Application Function (AF), such as a Computer-Aided Dispatch Server (CAD) 142, an Incident Command System Server (ICS) 144, an Incident Management Application Server (IMA) 146, and an location translation database 148. Location translation database 148 may be maintained by CAD 142 or any of servers 144 or 146, may be maintained by a service network server separate from, and accessible by, CAD 142 and servers 144 and 146, or may be maintained by a network element outside of service network 140 and be accessible by elements of service network 140. For example, when a CAD, such as CAD 142, defines an incident, it usually provides a geographical location of the incident, such as a street address, GPS (Global Positioning System) coordinates, or other geospatial coordinates known in the art. Location translation database 148 maintains a mapping of such geographical locations to cells serving such locations, such that CAD 142 can query the location translation database with a geographical location and the location translation database will return to the CAD a list of one or more cells corresponding to the provided location.

For ease of reference, elements of the service network may be referred to herein as service network elements. Each service network element 142, 144, 146, has one or more of a bearer connection and a signaling connection with WAN 110. For example, in a 3GPP LTE communication system, each service network element may transport data to UEs 102, 104 by routing the data to a PDN GW of the Core Network 130. The data is sent to the appropriate Access Node 122, 124 where each UE is located and ultimately transmitted to the UEs 102, 104 utilizing wireless links 106, 108.

Communication system 100 further includes a Device Class Prioritization Control Function (DCP-CF) 150 that controls which UEs may access a network, and the services provided to such UEs, in the event of an occurrence of an emergency incident. For example, the DCP-CF may be an Access Class Barring Control Function (ACB-CF) that controls attempts by a UE to access an uplink access channel in the event of an occurrence of an emergency incident. In various embodiments of the present invention, DCP-CF 150 may be implemented by an access node, such as access nodes 122 and 124, by an element of core network 130, such as NMS 132, EMS 134, or an MME, or by a service network 140 server, such as CAD 142, ICS 144, IMA 146, or a stand-alone server. In still other embodiments of the present invention, DCP-CF 150 may be implemented as an element separate from, and accessible by, elements of core network 130 and service network 140, for example, as middleware above core network 130 and below service network 140. Collectively, RAN 120, core network 130, service network 140, and DCP-CF 150 may be referred to as an infrastructure of communication system 100 and the elements of RAN 120, core network 130, service network 140, and the element implementing DCP-CF 150, may be referred to as infrastructure devices or infrastructure elements of communication system 100.

WAN 110 includes a location and mobility database, such as the aforementioned HSS, a Home location Register (HLR), a Visited Location Register (VLR), or an application level location service, that is accessible by the elements of service network 140, for example, CAD 142, ICS 144, and IMA 146, and by DCP-CF 150. For example, a service network element or DCP-CF 150 may query a Policy Control and Charging Rules Function (PCRF) of core network 130 for the identity of an access node and/or a cell serving a mobile device. In response to receiving the query, the PCRF may retrieve, from an HSS, an identifier of an access node, for example, an eNodeB identifier (eNodeB ID), and/or of a cell, such as a Physical Cell Identifier (PCI), a Target Cell Identifier (TCI), and a E-UTRAN Cell Global Identifier (ECGI), which serves the mobile device and provide the retrieved access node and/or cell identifier to the querying service network element or DCP-CF. By way of another example, when a service network element such as CAD 142 determines that an incident has occurred, the CAD typically identifies a geographical location of the incident, such as a street address, GPS (Global Positioning System) coordinates, or other geospatial coordinates known in the art. The CAD then may provide the identified geographical location to location translation database 148 and the location translation database will return to the CAD a list of one or more cells corresponding to the provided location.

Referring now to FIGS. 2-6, block diagrams are provided of a UE 200, such as UEs 102 and 104, a wireless access node 300, such as access nodes 122, 124, a core network element 400, such as NMS 132 or EMS 134, a service network element 500, such as CAD 142, ICS 144, and IMA 146, and an infrastructure device 600 implementing DCP-CF 150, in accordance with various embodiments of the present invention. Each of UE 200, access node 300, core network element 400, service network element 500, and infrastructure device 600 includes a respective processor 202, 302, 402, 502, and 602. The particular operations/functions of processors 202, 302, 402, 502, and 602, and thus of UE 200, access node 300, core network element 400, service network element 500, and infrastructure device 600, in communication system 100 is determined by an execution of software instructions and routines that are stored in a respective at least one memory device 204, 304, 404, 504, and 604 associated with the processor, such as but not limited to a hard disk, a CD-ROM, an optical storage device, a magnetic storage device, random access memory (RAM), dynamic random access memory (DRAM), a ROM (Read Only Memory), a PROM (Programmable Read Only Memory), an EPROM (Erasable Programmable Read Only Memory), an EEPROM (Electrically Erasable Programmable Read Only Memory), a Flash memory, or equivalents thereof. Each of access node 300, core network element 400, service network element 500, and infrastructure device 600 further includes a corresponding one or more network interfaces 306, 406, 506, and 610 communicatively coupled to the corresponding processor and for interfacing with, and exchanging signaling with, other elements of the infrastructure of communication system 100.

UE 200 further includes an at least one transceiver 206, comprising a radio frequency (RF) receiver (not shown) and an RF transmitter (not shown), for wirelessly receiving signals from, and transmitting signals to, the infrastructure of communication system 100, and in particular an access node, such as access nodes 122 and 124. Similarly, access node 300 further includes an at least one transceiver 306, comprising a radio frequency (RF) receiver (not shown) and an RF transmitter (not shown), for wirelessly receiving signals from, and transmitting signals to, UEs serviced by the access node, such as UEs 102 and 104.

UE 200 further maintains, in its at least one memory device 204, a device class value associated with the UE, for example, an access class (AC) value, typically of a value from '0' to '15.' The UE may use the stored device class value to determine whether or not it may acquire an access channel, for example, a RACH, when attempting to access a serving access node, such as access nodes 122 and 124. For example, a commercial user may be randomly assigned an AC of '0' to '9,' AC '10' is reserved for E911 calls, ACs '11' and '15' are reserved for network administrative devices, and the remaining ACs of '12' to '14' are for public safety and next generation network (NGN) government emergency telecommunications service (GETS) workers. That is, AC '12' is reserved for security services (for example, police), AC '13' is reserved for public utilities, and AC '14' is reserved for emergency services (that is, emergency responders).

Access node 300 also maintains, in its at least one memory device 304, one or more identifiers of the access node and or a cell served by the access node, for example, an eNodeB identifier (eNodeB ID), a cell identifier (Cell ID), an E-UTRAN Cell ID (ECI), or an E-UTRAN Cell Global Identifier (ECGI). As is known in the art, an access node such as an eNodeB may regularly broadcast such one or more identifiers in overhead messages, so that a UE residing in a coverage area served by the eNodeB can determine its serving eNodeB and/or associate measurements with an eNodeB sourcing the signal.

Core network element 400 and infrastructure device 600 each further may maintain, in their respective at least one memory devices 404, 604, a respective location module 406, 606. Each of location modules 406, 606 comprises a mapping between cells and/or access nodes and geographical locations. In one embodiment, each location module 406, 606 may comprise a table mapping identifiers of cells and/or access nodes to geographical locations. That is, the location module may comprise a list of identifiers of WAN 110 access nodes and/or cells and a mapping between the identifiers of each such cell/access node and a corresponding geographical coverage area, for example, street addresses, geographic coordinates (such as latitude and longitude), or geographical boundaries, such as geo-fences or geographical polygons. The cells/access nodes may be identified by any cell identifier or access node identifier known in the art, such as Cell Identifiers, Sector Identifiers, Base Station Identifiers, Tracking Area Identifiers, Location Area Identifiers, and so on. In others embodiments, one or more of location modules 406, 606 may comprise an algorithm, wherein a cell/access node identifier may be input and a corresponding geographical location is output, or visa versa.

Infrastructure device 600 further maintains, in its at least one memory device 604, data and programs for implementing DCP-CF 150. Additionally, infrastructure device 600 maintains, in its at least one memory device 604, a policy module 608 that comprises policies for automatically determining whether to enable device class prioritization (DCP), for example, access class barring (ACB). For example, policy module 608 may include listings of possible combinations of one or more incident-related parameters, such as an incident type, an incident severity, a number of served UEs, a number of active UEs, and cell/access node loading for a given cell or access node. For each such combination, the table would indicate whether the combination would trigger implementation of DCP. The table may be generic for all cells/access nodes, or there may be multiple tables that are cell/access node specific. In yet other embodiments of the present invention, policy module 608 may maintain an algorithm, wherein inputs to the algorithm may include any one or more of an incident type, an incident severity, a number of served UEs, a number of active UEs, and cell/sector/access node loading, and may further include an cell/access node identifier, and which algorithm's output would be an indication of whether to enable DCP based on the inputs. The algorithm, too, may be generic for all cells/access nodes or there may be multiple algorithms that are cell/access node specific.

The embodiments of the present invention preferably are implemented within UEs 102 and 104, access nodes 122 and 124, NMS 132 and EMS 134, service network elements 142 144, and 146, and DCP-CF 150, and more particularly with or in software programs and instructions stored in the respective at least one memory device 204, 304, 404, 504 and 604 and executed by respective processors 202, 302, 402, 502, and 602 associated with the of the UEs, access node, NMS, EMS, service network elements, and DCP-CF. However, one of ordinary skill in the art realizes that the embodiments of the present invention alternatively may be implemented in hardware, for example, integrated circuits (ICs), application specific integrated circuits (ASICs), and the like, such as ASICs implemented in one or more of UEs, access nodes, NMS, EMS, service network elements, and DCP-CF. Based on the present disclosure, one skilled in the art will be readily capable of producing and implementing such software and/or hardware without undo experimentation.

In communication system 100, when an emergency incident occurs, such as a fire, a criminal event, a hazardous spill, an act of terrorism, and so on, multiple emergency responders may be directed to the site of the incident. However, in the prior art, when the emergency responders arrive at the incident site, there is the possibility that they will not be able to access a broadband network available at the site, such as WAN 110, as the broadband network might not have sufficient bandwidth to accommodate both emergency responders and other users, such as utility workers and commercial users, competing for the same wireless resources. While the 3GPP LTE standards provide Access Class Barring (ACB) functionality to mitigate congestion in such a situation, the problem with ACB is that it traditionally has to be manually enabled by a system operator. Further, ACB as currently implemented in a 3GPP LTE system is reactive, that is, it controls access to an eNodeB in response to the operator determining that an eNodeB is congested. This can cause access delays for new arriving emergency responders, both in that they cannot access the network until the congestion is mitigated and they have to wait to an appropriate amount of time, for example, a time period associated with their access class, to again attempt to access the system after a failure of an initial attempt (due to congestion). Further, access control is localized to each eNodeB and implementation of a system-wide policy and control is not a simple matter. In order to minimize such problems, communication system 100 provides an access control scheme that is automatically enabled, that may provide system-wide policy and control, and that has the capability of proactively controlling network access. Once the DCP-CF 150 has received incident information, such as the address and severity of an incident, from service network elements 140, the DCP-CF may identify one or more access nodes that will enable ACB. Additionally, the DCP-CF may adjust ACB parameters to favor the use of public safety UEs at one of the identified access nodes, for example, due to superior characteristics (such as strongest uplink or downlink RF signal, MBMS capabilities, ProSe capabilities, most likely to be off-loaded by the time responders arrive, least currently loaded, and the like). In such a case, ACB parameters may be set to reduce or block commercial users on the public safety access node, but be more favorable to commercial users on another nearby access node. Various multi-cell ACB prioritization strategies are contemplated. Alternatively, public commercial UEs could be throttled to a fixed utilization percentage on one or more access nodes associated with the incident address, allowing preferential access to public safety UEs.

Figure 7:
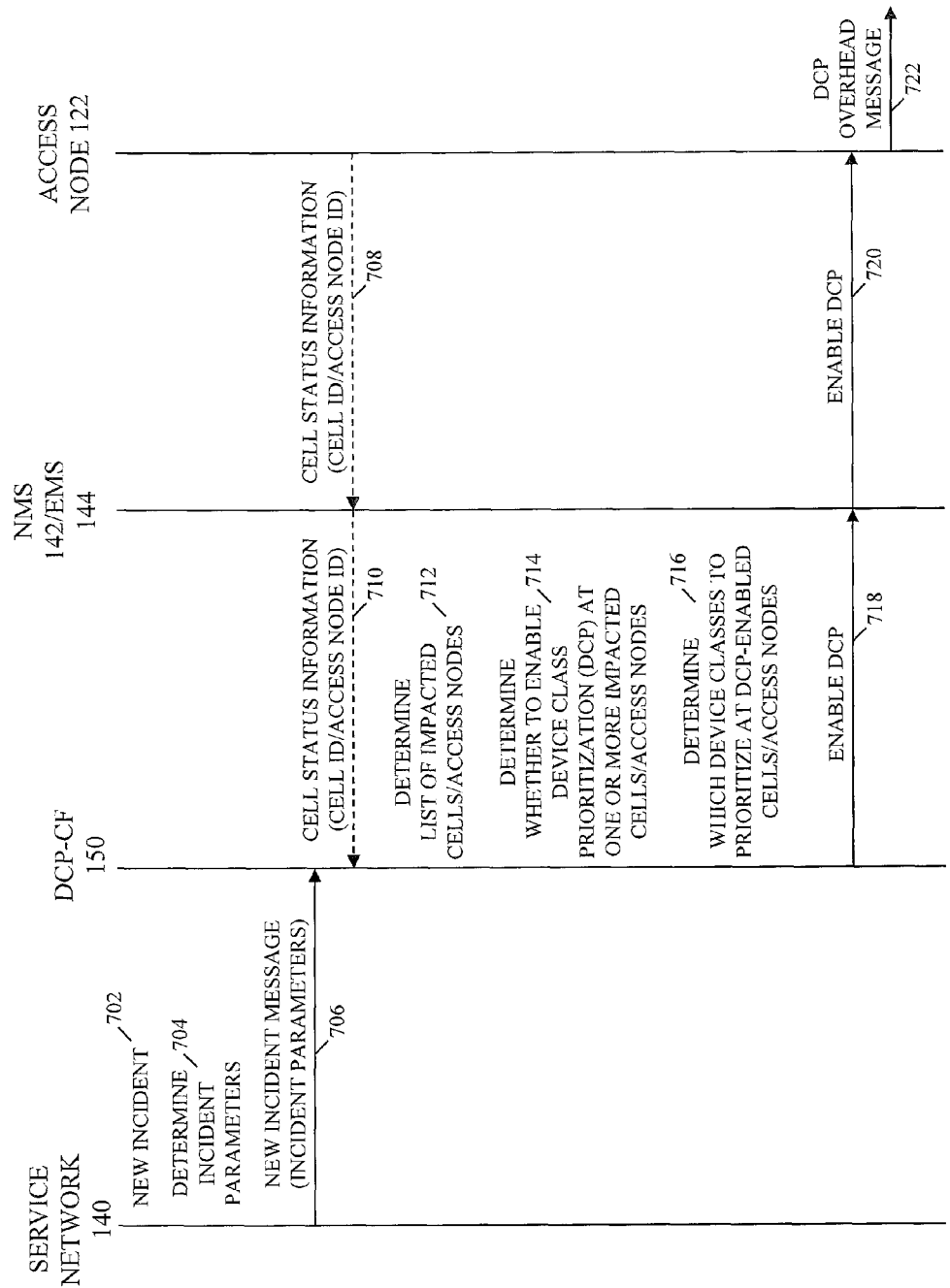
FIG. 7 is a signal flow diagram illustrating a method executed by the communication system of FIG. 1 in controlling network access in accordance with various embodiments of the present invention.

Referring now to FIG. 7, a signal flow diagram 700 is depicted that illustrates a method by which communication system 100 controls network access in accordance with various embodiments of the present invention. Signal flow diagram 700 begins when a service network 140 element, such as CAD 142, ICS 144, or IMA 146, determines 702 that a new emergency incident has occurred. For example, in one such embodiment, an emergency operator at a 911, 999, or 112 call center may receive a telephone call informing of an emergency incident. As is known in the art, the operator then obtains a street address of the incident from the caller and determines an incident type, such as a fire, a criminal event, a hazardous spill, an act of terrorism, and so on, and, if possible, a severity of the incident. Based on the incident type and severity, the operator may determine what type of emergency responder should respond to the incident and what type of public safety agency to contact. Based on the determined emergency responder type and agency, the operator then reports the incident type, severity, and street address to a service network 140 element at an appropriate public safety agency, for example, to an operator of CAD 142, ICS 144, or IMA 146, that is, a dispatcher, at the public safety agency.

In other embodiments, the determination that a new emergency incident has occurred, the street address of the incident, and the type of incident may be based on a triggering of an alarm in the field, such as a fire alarm, chemical/biological/radiological detector, video or audio analytic, or a police alarm located at a pre-determined address, or any other emergency incident reporting scheme as known in the art. In such embodiments, the alarm may automatically trigger another alarm at the CAD 142, ICM 144, or IMA 146, which alarm may include information concerning the incident type and may identify a geographical location, for example, a street address, of the incident.

In response to being informed of the new emergency incident, the service network 140 element determines multiple incident-related parameters, that is, assigns an incident identifier to the incident, determines an incident severity, assigns public safety personnel (and correspondingly, UEs) who are to respond to the incident, and determines a geographical location of the incident, such as a street address, geo-coordinates (for example, longitude and latitude), or a geo-fence or geographic perimeter around the incident. The service network 140 element then conveys 706 a new incident message to DCP-CF 150, which message includes the determined incident-related parameters, that is, the incident identifier, the incident type, the incident severity, the assigned public safety personnel/UEs, and the geographical location of the incident.

Optionally, DCP-CF 150 further may receive 708, 710, from each of multiple access nodes served by the DCP-CF 150, such as access nodes 122 and 124, via a core network serving the access nodes, that is, core network 130, cell/access node status information. Such information may be conveyed by the access nodes to, and received by, the DCP-CF 150 prior to, concurrent with, or subsequent to the conveyance of the new incident message to the DCP-CF.

The cell/access node status information comprises information that may be used by DCP-CF 150 to determine whether to enable DCP at the access node in the event that the cell or associated access node is determined to be an impacted cell/access node. For example, the cell/access node status information may include an access node or cell identifier (for example, an eNodeB identifier (eNodeB ID), a cell identifier (Cell ID), an E-UTRAN Cell ID (ECI), or an E-UTRAN Cell Global Identifier (ECGI)), an operational status of the cell/access node (for example, an amount of bandwidth assigned and/or available for assignment at the cell/access node, a number of UEs currently in active communication with the access node, and indications of whether operations at the cell/access node are normal (no congestion), impaired (somewhat congested), or overloaded), and an administrative status of the cell/access node (for example, whether the cell/access node is locked or unlocked; that is, a locked cell/access node is a cell/access node for which normal use by a UE is prevented, for example, a cell/access node that is taken off-line for maintenance, upgrade, or reconfiguration purposes, as opposed to an unlocked cell/access node that is in normal operation).

Based on the incident geographical location information included in the new incident message and by reference to location module 606, the cell/access node status information received from the multiple access nodes, that is, access nodes 122 and 124, and/or by querying location translation database 148, DCP-CF 150 determines 712 a list of cells/access nodes impacted by the new emergency incident, for example, access node 122. That is, by reference to location module 606, the cell/access node status information received from the access nodes, or the location translation database, DCP-CF 150 determines the access nodes/cells that correspond to the geographical locations identified in the new incident message.

Further, based on one or more of the incident type, the incident severity, and the assigned public safety personnel/UEs information included in the new incident message and by reference to policy module 608 and/or the cell/access node status information received from the access nodes, DCP-CF 150 also determines 714 whether device class prioritization (DCP), such as access class barring (ACB), is triggered at, that is, whether to enable DCP at, one or more of the impacted cells/access nodes, that is, cell 126/access node 122. A determination of what combination of one or more of incident type, incident severity, and assigned public safety personnel/UEs (such as a number of assigned public safety personnel/UEs and a role of each assigned public safety officer), an operational status of the cell/access node, and administrative status of the cell/access node triggers enablement of DCP is up to a designer of system 100, as one of ordinary skill in the art can imagine extraordinarily numerous such combinations. However, it is likely that the higher the incident severity, the greater the number or importance of assigned public safety personnel/UEs, the more highly congested the cell/access node, and an unlocked cell/access node, the more likely the enablement of DCP will be triggered at an impacted cell/access node.

In response to determining to enable DCP at an impacted cell/access node, such as cell 126/access node 122, DCP-CF 150 also determines 716 which classes of UEs, such as access classes (ACs) (for example, from among ACs 0-15), to prioritize at the impacted access nodes/cells. For example, in the event of an emergency incident, DCP-CF 150 may determine to prioritize one or more device classes, such as access class (AC) 14, that is, emergency services, as AC 14 typically covers emergency responders. Thus UEs associated with AC 14 may be prioritized, for example, provided with prioritized access to the uplink access channel, such as higher probability or unfettered access to the uplink access channel, while access to the uplink access channel for UEs associated with non-prioritized device classes, such as ACs 0-13 and 15, is reduced (have a lower probability than the prioritized UEs) or barred. While AC 14 is described as being prioritized here, the ACs that may be prioritized is up to a designer of the communication system and other combinations of prioritized and non-prioritized ACs are possible. Further, in other embodiments of the present invention, the combination of prioritized and non-prioritized device classes, such as ACs, may vary from access node to access node and/or may vary based on the determined incident parameters. For example, the more severe the incident, or the larger the number of UEs served by a cell/access node, the fewer the number of ACs that may be prioritized. The DCP-CF 150 not only determines which cells/access nodes to include for ACB, but also determines the degree to which one or more device classes are prioritized for the one or more of the cell/access node, that is, the degree or level of barring for each class of UE at each cell/access node (for example, by adjusting barring parameters, such as acBarringFactor, acBarringTime, acBarringForEmergency, and acBarringForSpecialAC).

In other embodiments of the present invention, the DCP-CF 150 may enable one or more LTE barring capabilities simultaneously. For example, the DCP-CF may enable Service Specific Access Control (SSAC) for voice or video for one or more access classes in order to limit usage of the RACH and reduce cell load for cells associated with the incident. In this case, public safety UEs may be prioritized with respect to an ability to originate a telephony session (as opposed to non-prioritized classes of devices being blocked from originating a telephony session).

The DCP-CF 150 may enable Access Control for Circuit Switch Fallback (CSFB) for one or more access classes at an access node to prevent commercial users from accessing LTE only to be redirected to 3G circuit services, thereby reducing load on the access node and core network.

The DCP-CF 150 may determine to enable Extended Access Barring, that is, an ability to request any kind of service (as opposed service requests from non-prioritized classes of devices being rejected altogether).

The DCP-CF 150 may enable Closed Subscriber Group (CSG) checking at one or more eNodeBs in response the evaluation of incident information. Once enabled, an eNodeB would examine a UE's transmitted CSG ID during the attach process and determine if that CSG ID were present in the UE's HSS profile. The CSG ID of a public safety UE would be found in the UE's profile and designate usage of the given cell as permitted. Commercial UEs would be blocked and disallowed for cells determined by the DCP-CF to be part of the incident area because the commercial user's CSG ID would not indicate the commercial user could utilize the incident cell. Alternatively, commercial users will not have a CSG ID included in their profiles pertaining to the incident area cell(s). Thus, by the DCP-CF enabling CSG checking at a cell, the DCP-CF is able to restrict use of the access node's resources to public safety devices.

In response to determining the cells/access nodes impacted by the new emergency incident and to determining, for each impacted cell/access node, that is, cell 126/access node 122, whether to enable device class prioritization (DCP) at the cell/access node, DCP-CF conveys 718, 720, via the corresponding core network, that is, core network 130, an enable DCP message to each such cell/access node where DCP is to be enabled, that is, cell 126/access node 122. Those skilled in the art will recognize that the DCP-CF 150 may communicate an enable DCP message directly to the access node 122. The enable DCP message identifies the cell/access node, indicates which device classes, such as access class(es), are to be prioritized, which barring capabilities should be enabled, and, in the event of ACB, identifies the uplink access channel (for example, a RACH Subframe Interval). For example, an enable ACB message may indicate which access class(es) are to be prioritized by providing values for the various ACB parameters, which the UEs served by the cell/access node then may use in determine whether they can attempt to access the network (for example, an 'ac-BarringFactor,' an 'ac-BaningTime', an 'ac-BarringForEmergencyFactor,' and an 'ac-BarringForSpecialAC' parameter).

In response to receiving the enable DCP message, each such access node enables its DCP functionality and broadcasts 824 a control message, such as a SIB2 (System Information Block Type 2) message in the event of ACB or a SIB4 message in the event of extended access barring, identifying the device class(es) that are prioritized. Based on the control message, each UE served by the access node may determine whether it may one or more of attempt to acquire the access channel, originate a telephony session, perform CSFB, request any kind of service, or participate in a closed subscriber group at that access node, and signal flow diagram 700 then ends.

Figure 8:
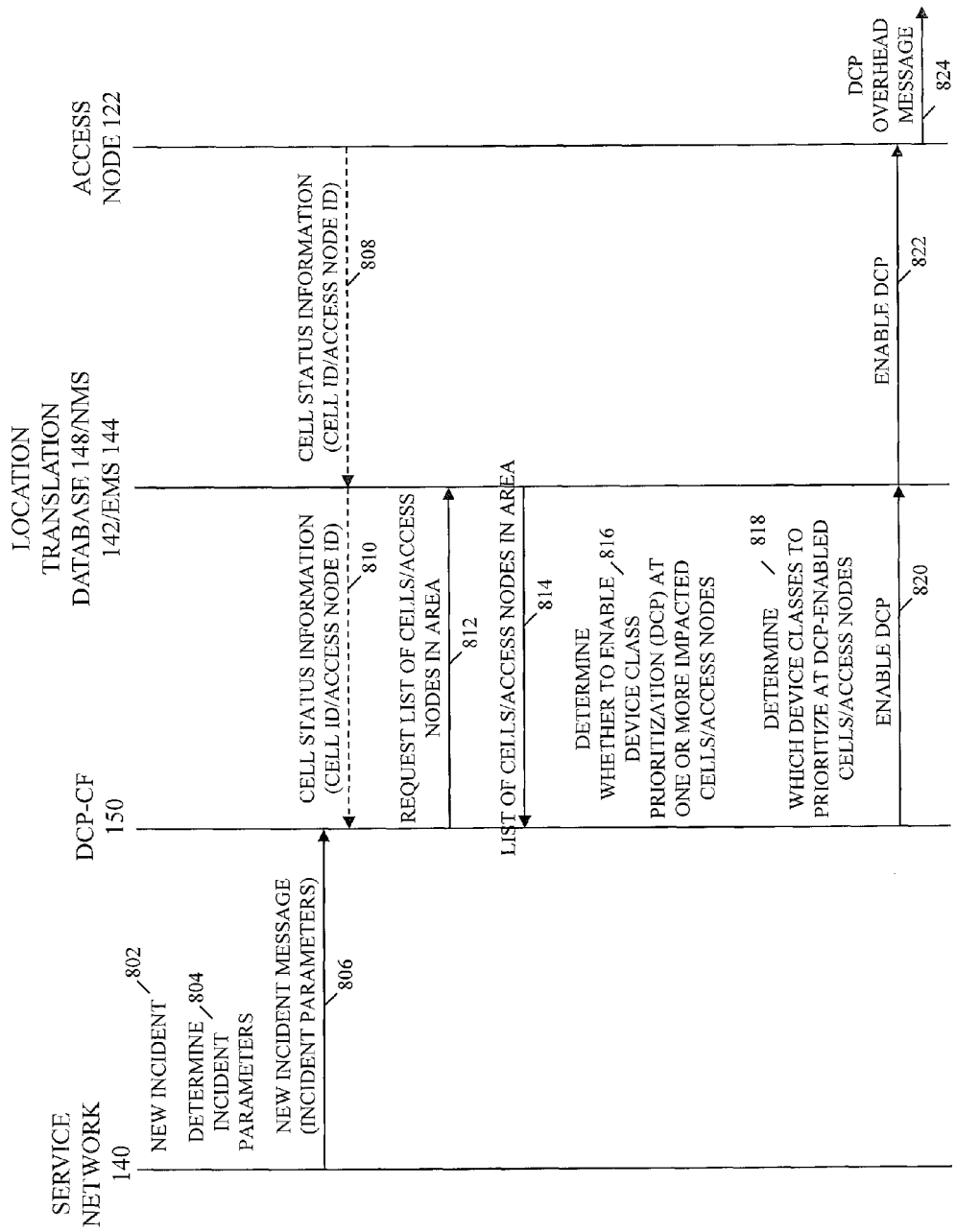
FIG. 8 is a signal flow diagram illustrating a method executed by the communication system of FIG. 1 in controlling network access in accordance with various other embodiments of the present invention.

Referring now to FIG. 8, a signal flow diagram 800 is depicted that illustrates a method by which communication system 100 controls network access in accordance with various other embodiments of the present invention. Similar to signal flow diagram 700, signal flow diagram 800 begins when a service network 140 element, such as CAD 142, ICS 144, or IMA 146, determines 802 that a new emergency incident has occurred.

In response to being informed of the new emergency incident, the service network 140 element determines multiple incident-related parameters associated with the incident, that is, assigns an incident identifier to the incident, determines an incident severity, assigns public safety personnel (and correspondingly, UEs) who are to respond to the incident, and determines a geographical location of the incident, such as a street address, geo-coordinates (for example, longitude and latitude), or a geo-fence or geographic perimeter around the incident. The service network 140 element then conveys 806 a new incident message to DCP-CF 150, which message includes the determined incident-related parameters, that is, the incident identifier, the incident type, the incident severity, the assigned public safety personnel/UEs, and the geographical location of the incident.

Optionally, DCP-CF 150 further may receive 808, 810 from each of multiple access nodes served by the DCP-CF 150, such as access nodes 122 and 124, via a core network serving the access node, that is, core network 130, cell/access node status information. Such information may be conveyed by the access nodes to, and received by, the DCP-CF 150 prior to, concurrent with, or subsequent to the conveyance of the new incident message to the DCP-CF.

Also similar to signal flow diagram 700, the cell/access node status information conveyed by each of the multiple access node 122, 124 comprises information that may be used by DCP-CF 150 to determine whether to enable DCP at the access node in the event that the cell/access node is determined to be an impacted cell/access node. For example, the cell/access node status information may include an access node or cell identifier, an operational status of the cell/access node, and an administrative status of the cell/access node.

In response to receiving the new incident message, DCP-CF 150 requests 812, from core network 130, a list of cells and/or access nodes impacted by the new emergency incident. For example, DCP-CF 150 may convey a location request to one or more of NMS 132/EMS 134, or to a core network element implementing location translation database 148, that includes the incident geographical location information received from the service network element. In response to receiving the location request, NMS 132/EMS 134 or location translation database 148, whichever is appropriate, may retrieve a list of one or more access nodes and cells servicing the geographical location of the incident, for example and in the case of NMS132/EMS 134, from location module 406, from a mobility database communicatively coupled to the NMS /EMS, such as an HSS, an HLR, a VLR, or from location translation database 148. NMS 132/EMS 134 or location translation database 148 then conveys 814 a response message to DCP-CF 150 that includes the list of impacted access nodes and/or cells, for example, that lists identifiers of such access nodes and/or cells, such as access node 122 and/or cell 126.

Further, based on one or more of the incident type, the incident severity, and the assigned public safety personnel/UEs information included in new incident message, the list of impacted access nodes and/or cells from core network 130, and by reference to policy module 608 and/or the cell/access node status information received from the access nodes, DCP-CF 150 also determines 816 whether device class prioritization (DCP) is triggered at, that is, whether to enable DCP at one or more of the impacted cells/access nodes, that is, access node 122 and corresponding cell 126.

Again, a determination of what combination of one or more of incident type, incident severity, and assigned public safety personnel/UEs (such as a number of assigned public safety personnel/UEs and a role of each assigned public safety officer), an operational status of the cell/access node, and administrative status of the cell/access node triggers enablement of DCP is up to a designer of system 100, as one of ordinary skill in the art can imagine extraordinarily numerous such combinations. However, it is likely that the the incident severity, the greater the number or importance of assigned public safety personnel/UEs, the more highly congested the cell/access node, and an unlocked cell/access node, the more likely enablement of DCP will be triggered at an impacted cell/access node.

In response to determining to enable DCP at an impacted cell/access node, such as cell 126/access node 122, DCP-CF 150 also determines 818 which classes of UEs, such as access classes (ACs) (for example, from among ACs 0-15), to prioritize at the impacted access nodes/cells. For example, in the event of an emergency incident, DCP-CF 150 may determine to prioritize one or more device classes, such as access class (AC) 14, that is, emergency services, as AC 14 typically covers emergency responders. Thus UEs associated with AC 14 may be prioritized, for example, provided with prioritized access to the uplink access channel, such as higher probability or unfettered access to the uplink access channel, while access to the uplink access channel for UEs associated with non-prioritized device classes, such as ACs 0-13 and 15, is reduced (have a lower probability than the prioritized UEs) or barred. While AC 14 is described as being prioritized here, the ACs that may be prioritized is up to a designer of the communication system and other combinations of prioritized and non-prioritized ACs are possible. Further, in other embodiments of the present invention, the combination of prioritized and non-prioritized device classes, such as ACs, may vary from access node to access node and/or may vary based on the determined incident parameters. For example, the more severe the incident, or the larger the number of UEs served by a cell/access node, the fewer the number of ACs that may be prioritized.

In other embodiments of the present invention, UEs associated with prioritized classes may be prioritized with respect to one or more of: an ability to originate a telephony session (as opposed to non-prioritized classes of devices being blocked from originating a telephony session), to perform circuit switched fallback (CSFB) from network 110 to network 120 (as opposed to having a communication session dropped altogether for non-prioritized classes of devices), extended access barring, that is, an ability to request any kind of service (as opposed service requests from non-prioritized classes of devices being rejected altogether), or being able to participate in a closed subscriber group (CSG). For example, in the event of an emergency incident, DCP-CF 150 may instruct an impacted access node to change a CSG ID used by the access node to a special, emergency CSG ID that has been pre-configured in the profiles of public safety device (for example, as maintained by an HSS). By contrast, commercial users will not have such a CSG ID included in their profiles. Thus, by the DCP-CF instructing the access node to change the CSG ID that it uses, the DCP-CF is able to restrict use of the access node's resources to public safety devices.

In response to determining the cells/access nodes impacted by the new emergency incident and to determining, for each impacted cell/access node, that is, cell 126/access node 122, whether to enable device class prioritization (DCP) at the cell/access node, DCP-CF conveys 820, 822, via the corresponding core network, that is, core network 130, an enable DCP message to each such cell/access node where DCP is to be enabled, that is, cell 126/access node 122. The enable DCP message identifies the cell/access node, indicates which device class(es), such as access class(es), are to be prioritized, and, in the event of ACB, identifies the uplink access channel (for example, a RACH Subframe Interval). For example, an enable ACB message may indicate which access class(es) are to be prioritized by providing values for the various ACB parameters, which the UEs served by the cell/access node then may use in determine whether they can attempt to access the network (for example, an 'ac-BarringFactor,' an 'ac-BarringTime', an 'ac-BarringForEmergencyFactor,' and an 'ac-BarringForSpecialAC' parameter).

In response to receiving the enable DCP message, each such access node enables its DCP functionality and broadcasts 824 a control message, such as a SIB2 in the event of ACB or a SIB4 message in the event of extended access barring, identifying the device class(es) that are prioritized. Based on the control message, each UE served by the access node may determine whether it may one or more of attempt to acquire the access channel, originate a telephony session, perform CSFB, request any kind of service, or participate in a closed subscriber group at that access node, and signal flow diagram 800 then ends.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for controlling network access in a wireless communication system, the method comprising:
    receiving, at an infrastructure device, a geographical location of an incident;
    determining, by the infrastructure device, one or more of a cell and a corresponding access node corresponding to the geographical location;
    determining one or more access class barring parameters comprising acBarringFactor, acBarringTime, acBarringForEmergency, and/or acBarringForSpecialAC for the one or more of the cell and the corresponding access node;
    determining whether to enable access class barring at one or more of the cell and the corresponding access node based on the access class barring parameters; and
    in response to determining to enable access class barring at one or more of the cell and the corresponding access node, providing the one or more one or more access class barring parameters to the one or more of the cell and the corresponding access node;
    wherein determining whether to enable access class barring comprises:
    receiving, by the infrastructure device, one or more of an incident type, an incident severity, an operational status of the one or more of the cell and the access node, and an administrative status of the one or more of the cell and the access node; and
    determining whether to enable access class barring based on one or more of the incident type, the incident severity, the operational status of the one or more of the cell and the access node, and the administrative status of the one or more of the cell and the access node
    wherein access is barred when a combination of the incident type, the incident severity, and a loading for a cell exceeds a trigger.

2. The method of claim 1, wherein the geographical location of the incident comprises one or more of a street address, geo-coordinates, and a geo-fence or geographic perimeter around the incident.

3. The method of claim 1, wherein determining one or more of a cell and an access node corresponding to the geographical location comprises one or more of:
    referencing a location module maintained by the device, wherein the location module associates one or more of a cell identifier and an access node identifier with a corresponding geographical location; and
    receiving one or more of a cell identifier and an access node identifier from another infrastructure device.

4. The method of claim 1, wherein determining one or more of a cell and an access node corresponding to the geographical location comprises:
    conveying, to a core network, the geographical location of the incident; and
    receiving, from the core network, one or more of a list of cells and a list of access nodes corresponding to the geographical location.

5. The method of claim 1, wherein determining to enable access class barring at one or more of the cell and the corresponding access node further comprises determining to one or more of:
    enable service specific access control for voice or video;
    prioritize classes that can perform circuit switched fallback;
    enable extended access barring; and
    enable closed subscriber group checking at one or more of the cell and the access node.

6. The method of claim 1, further comprising determining one or more device classes to prioritize.

7. The method of claim 6, further comprising determining, by the infrastructure device, a degree to which one or more device classes are prioritized for the one or more of the cell and the access node.

8. The method of claim 6, wherein indicating, by the infrastructure device to the one or more of the cell and the access node, one or more device classes to prioritize comprises:
    conveying, by the infrastructure device to the one or more of the cell and the access node, an enable device class prioritization message.

9. The method of claim 6, further comprising:
broadcasting, by the access node, a device class prioritization control message that identifies the prioritized classes.

10. The method of claim 9, further comprising:
determining, by a user equipment, whether it is a prioritized device based on the device class prioritization control message.

11. An infrastructure device capable of controlling network access in a wireless communication system, the infrastructure device comprising:
a processor;
an at least one memory device that is configured to store a set of instructions that, when executed by the processor, implement a device class prioritization control function (DCP-CF), which DCP-CF performs the following functions:
receives a geographical location of an incident;
determines one or more of a cell and a corresponding access node corresponding to the geographical location;
determines one or more access class barring parameters comprising acBarringFactor, acBarringTime, acBarringForEmergency, and/or acBarringForSpecialAC for the one or more of the cell and the corresponding access node;
determines whether to enable access class barring at one or more of the cell and the corresponding access node based on the access class barring parameters; and
in response to determining to enable access class barring at one or more of the cell and the corresponding access node, provides the one or more one or more access class barring parameters to the one or more of the cell and the corresponding access node;
wherein the infrastructure device comprises:
one or more network interfaces that are configured to receive one or more of an incident type, an incident severity, an operational status of the one or more of the cell and the access node, and an administrative status of the one or more of the cell and the access node; and
wherein the set of instructions, when executed by the processor, determine whether to enable access class barring based on one or more of the incident type, the incident severity, the operational status of the one or more of the cell and the access node, and the administrative status of the one or more of the cell and the access node such that access is barred when a combination of the incident type, the incident severity, and a loading for a cell exceeds a trigger.

12. The infrastructure device of claim 11, wherein the geographical location of the incident comprises one or more of a street address, geo-coordinates, and a geo-fence or geographic perimeter around the incident.

13. The infrastructure device of claim 11, wherein the at least one memory device is configured to maintain a location module that associates one or more of cell identifier and an access node identifier with a corresponding geographical location and wherein the set of instructions, when executed by the processor, determine one or more of a cell and an access node corresponding to the geographical location by one or more of:
referencing the location module; and
receiving one or more of an access node identifier and a cell identifier from another infrastructure device.

14. The infrastructure device of claim 11, wherein the set of instructions, when executed by the processor, determine one or more of a cell and an access node corresponding to the geographical location by:
conveying to a core network, the geographical location of the incident; and
receiving, from the core network, one or more of a list of cells and a list of access nodes corresponding to the geographical location.

15. The infrastructure device of claim 11, wherein the one or more network interfaces are configured to receive the incident type and the incident severity from a service network element and are configured to receive the operational status of the one or more of the cell and the access node and the administrative status of the one or more of the cell and the access node from a radio access network.

16. The infrastructure device of claim 11, wherein the set of instructions, when executed by the processor, determine one or more device classes to prioritize.

17. The infrastructure device of claim 16, wherein the set of instructions, when executed by the processor, determine the degree to which one or more device classes are prioritized for the one or more of the cell and the access node.

18. The infrastructure device of claim 16, wherein the set of instructions, when executed by the processor, determine to enable access class barring at one or more of the cell and the corresponding access node by further determining to one or more of:
enable service specific access control for voice or video;
prioritize classes that can perform circuit switched fallback;
enable extended access barring; and
enable a closed subscriber group checking at one or more of the cell and the access node.

* * * * *